(12) United States Patent
Yao et al.

(10) Patent No.: US 10,587,370 B2
(45) Date of Patent: Mar. 10, 2020

(54) METHOD AND APPARATUS FOR PERFORMING HYBRID AUTOMATIC REPEAT REQUEST PROCESSES

(71) Applicant: Nokia Technologies Oy, Espoo (FI)

(72) Inventors: Chunhai Yao, Beijing (CN); Timo Erkki Lunttila, Espoo (FI); Klaus Hugl, Vienna (AT); Esa Tapani Tiirola, Kempele (FI)

(73) Assignee: NOKIA TECHNOLOGIES OY, Espoo (FI)

(*) Notice: Subject to any disclaimer, the term of this patent is extended or adjusted under 35 U.S.C. 154(b) by 89 days.

(21) Appl. No.: 15/489,200

(22) Filed: Apr. 17, 2017

(65) Prior Publication Data
US 2017/0317790 A1 Nov. 2, 2017

(30) Foreign Application Priority Data
Apr. 28, 2016 (WO) ................ PCT/CN2016/080501

(51) Int. Cl.
*H04L 1/18* (2006.01)
*H04L 5/00* (2006.01)
*H04W 72/14* (2009.01)

(52) U.S. Cl.
CPC .......... *H04L 1/1812* (2013.01); *H04L 5/0051* (2013.01); *H04W 72/14* (2013.01)

(58) Field of Classification Search
CPC ... H04L 1/1812; H04L 1/1887; H04L 5/0051; H04W 72/14
See application file for complete search history.

(56) References Cited

U.S. PATENT DOCUMENTS

2005/0276249 A1  12/2005 Damnjanovic et al.
2015/0043392 A1* 2/2015 Susitaival ............ H04L 5/1469
                                                      370/280
(Continued)

FOREIGN PATENT DOCUMENTS

CN    101330372 A    12/2008
CN    101606347 A    12/2009
(Continued)

OTHER PUBLICATIONS

International Search Report and Written Opinion received for corresponding Patent Cooperation Treaty Application No. PCT/CN2016/080501 dated Apr. 28, 2016, 11 pages.

"New Work Item on Uplink Capacity Enhancements for LTE", 3GPP TSG-RAN Meeting#71, RP-160664, Agenda: 10.1.1, Ericsson, Mar. 7-10, 2016, 9 pages.

(Continued)

*Primary Examiner* — Jianye Wu
(74) *Attorney, Agent, or Firm* — Squire Patton Boggs (US) LLP

(57) ABSTRACT

A method and apparatus may include receiving an uplink grant in a specific subframe of a frame and/or a physical hybrid-ARQ indicator channel transmission, for a physical-uplink-shared-channel transmission or retransmission on a special subframe. The method may also include determining that the uplink grant validates transmitting a physical-uplink-shared-channel transmission on the special subframe, or that the physical hybrid-ARQ indicator channel transmission validates transmitting a physical-uplink-shared-channel retransmission on the special subframe. The method may also include determining transmission parameters for transmitting the physical-uplink-shared-channel transmission or retransmission. The method may also include transmitting the physical-uplink-shared-channel transmission or retransmission on the special subframe.

18 Claims, 22 Drawing Sheets

(56) References Cited

U.S. PATENT DOCUMENTS

| | | | | |
|---|---|---|---|---|
| 2015/0043434 A1* | 2/2015 | Yamada | ............ | H04W 72/0446 370/329 |
| 2016/0338049 A1 | 11/2016 | Takeda et al. | | |
| 2017/0027013 A1* | 1/2017 | Kim | ...................... | H04W 72/04 |

FOREIGN PATENT DOCUMENTS

| | | |
|---|---|---|
| CN | 102804675 A | 11/2012 |
| CN | 103430468 A | 12/2013 |
| CN | 104885399 A | 9/2015 |
| CN | 105264807 A | 1/2016 |
| EP | 2728954 A1 | 5/2014 |
| EP | 2897318 A1 | 7/2015 |
| EP | 3131222 A1 | 2/2017 |
| EP | 3 151 460 A1 | 4/2017 |
| WO | 2015010604 A1 | 1/2015 |
| WO | 2015/108008 A1 | 7/2015 |
| WO | 2015/154310 A1 | 10/2015 |
| WO | 2015/196460 A1 | 12/2015 |

OTHER PUBLICATIONS

"3rd Generation Partnership Project; Technical Specification Group Radio Access Network; Evolved Universal Terrestrial Radio Access (E-UTRA); Physical layer procedures (Release 13)", 3GPP TS 36.213, V13.1.0, Mar. 2016, pp. 1-361.

"3rd Generation Partnership Project; Technical Specification Group Radio Access Network; Evolved Universal Terrestrial Radio Access (E-UTRA); Physical channels and modulation(Release 13)", 3GPP TS 36.211, V13.1.0, Mar. 2016, pp. 1-155.

Office action received for corresponding Vietnam Patent Application No. 1-2017-01260, dated Jun. 14, 2017, 1 page of office action and 1 page of translation available.

Extended European Search Report received for corresponding European Patent Application No. 17166398.2, dated Aug. 31, 2017, 9 pages.

European Office Action corresponding to EP Appln. No. 17 166 698.2, dated Oct. 21, 2019.

Chinese Office Action corresponding to CN Application No. 201710192937.7, dated Nov. 26, 2019.

\* cited by examiner

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $(1+X) \cdot 2192 \cdot T_s$ | $(1+X) \cdot 2560 \cdot T_s$ | $7680 \cdot T_s$ | $(1+X) \cdot 2192 \cdot T_s$ | $(1+X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $(2+X) \cdot 2192 \cdot T_s$ | $(2+X) \cdot 2560 \cdot T_s$ | $20480 \cdot T_s$ | $(2+X) \cdot 2192 \cdot T_s$ | $(2+X) \cdot 2560 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | ... | ... | ... |
| 9 | $13168 \cdot T_s$ | | | ... | ... | ... |

Fig. 1(a)

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Fig. 1(b)

| UL/DL configuration 0 | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| subframe index | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| subframe | 0 | U | U | D | S | U | U | U | D | S | U | U | U | D | S | U | U | U | D | S | U | U | U | D | S | U | U | U | D | S | U | U | U |
| HARQ Process ID | 1 | 2 | 3 | | | 4 | 5 | 6 | | | 7 | 1 | 4 | | | 3 | 2 | 5 | | | 6 | 1 | 4 | | | 3 | 2 | 5 | | | 6 | | |
| UL Grant/PHICH ReIB | | | | | G67 G71 | | | | G23 G34 | | | | G56 G67 | | | | G12 G23 | | | | G45 G56 | | | | G71 G12 | | | |
| PHICH | | | | | P67 P1 | | | | P23 P4 | | | | P56 P7 | | | | P12 P3 | | | | P45 P6 | | | | P71 P2 | | | |
| Solution UL Grant | | | | | G69 G71 | | | | G28 G34 | | | | G59 G67 | | | | G15 G23 | | | | G49 G56 | | | | G78 G12 | | | |
| PHICH | | | | | P67 P1 | | | | P23 P4 | | | | P56 P7 | | | | P12 P3 | | | | P45 P6 | | | | P71 P2 | | | |

Fig. 2

| UL/DL configuration 0 | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| subframe index | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 |
| subframe | | | | D | S | U | U | U | D | S | U | U | U | D | S | U | U | U | D | S | U | U | U | D | S | U | U | U | D |
| HARQ Process ID | 1 | 2 | 3 | | 4 | 5 | 6 | | | | 7 | 1 | 2 | | 3 | 4 | 5 | | | | 6 | 7 | 1 | | 2 | 3 | 4 | | |
| UL Grant/PHICH Rel.8 | G67 | G71 | | | G23 | G34 | G56 | G67 | | | G12 | G23 | | | G45 | G56 | G67 | G71 | | | G12 | G23 | | | G45 | G56 | G71 | G12 | |
| PHICH | P67 | P1 | | | P23 | P4 | P56 | P7 | | | P12 | P3 | | | P45 | P6 | P67 | P1 | | | P12 | P3 | | | P45 | P6 | P1 | P2 | |
| Solution grant | G67 | G1 | | | G23 | G4 | G56 | G67 | | | G12 | G3 | | | G45 | G6 | G67 | G71 | | | G12 | G3 | | | G45 | G6 | G71 | G12 | |
| PHICH | P67 | P1 | | | P23 | P4 | P56 | P7 | | | P12 | P3 | | | P45 | P6 | P67 | P1 | | | P12 | P3 | | | P45 | P1 | P2 | | |

| UL/DL configuration 2 | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| subframe index | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| subframe | D | D | D | D | S | U | D | D | D | S | U | D | D | D | S | U | D | D | D | S | U | D | D | D | S | U | D | D | D | S | U | D |
| HARQ Process ID | | | 3 | 2 | | | | | 8 | 1 | | | 3 | 2 | | | | | 8 | 1 | | | 3 | 2 | | | | | 8 | 1 | | |
| UL Grant/PHICH | G2 P2 | | G4 P4 | G1 P1 | | | | | G3 P3 | G2 P2 | | | G4 P4 | G1 P1 | | | | | G3 P3 | G2 P2 | | | G4 P4 | G1 P1 | | | | | G3 P3 | G2 P2 | | |
| Solution Grant/PHICH | G2 P2 | | G4 P4 | G1 P1 | | | | | G3 P3 | G2 P2 | | | G4 P4 | G1 P1 | | | | | G3 P3 | G2 P2 | | | G4 P4 | G1 P1 | | | | | G3 P3 | G2 P2 | | |

Fig. 7

| UL/DL configuration3 | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| subframe index | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| subframe | D | D | D | S | U | U | U | D | D | D | D | D | D | S | U | U | U | D | D | D | D | D | D | S | U | U | U | D | D | D | D | D |
| HARQ Process ID | 1 | | | #1 | 1 | 2 | 3 | | | | | | | #1 | 1 | 2 | 3 | | | | | | | #1 | 1 | 2 | 3 | | | | | |
| UL Grant/PHICH | Rel.8 | G1 | G2 | G3 | | | | | | | | G1 | G2 | G3 | | | | | | | | | G1 | G2 | G3 | | | | | | | G1 | G2 |
| | PHICH | P1 | P2 | P3 | | | | | | | | P1 | P2 | P3 | | | | | | | | | P1 | P2 | P3 | | | | | | | P1 | P2 |
| Solution | Grant | G1 | G2 | G3 | | | | | | G4 | G1 | G2 | G3 | | | | | | | | G4 | G1 | G2 | G3 | | | | | | G4 | G1 | G2 |
| | PHICH | P1 | P2 | P3 | | | | | | P4 | P1 | P2 | P3 | | | | | | | | P4 | P1 | P2 | P3 | | | | | | P4 | P1 | P2 |

Fig. 8

| UL/DL configuration 4 | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| subframe index | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| subframe | D | D | D | S | U | U | D | D | D | D | D | D | D | S | U | U | D | D | D | D | D | D | D | S | U | U | D | D | D | D | D | D |
| HARQ Process ID | | | | | 3 | 1 | 2 | | | | | | | | 3 | 1 | 2 | | | | | | | | 3 | 1 | 2 | | | | | |
| Rel.8 UL Grant/PHICH Grant | G1 | G2 | | | | | | | | | G1 | G2 | | | | | | | | | G1 | G2 | | | | | | | | | | |
| Rel.8 PHICH | P1 | P2 | | | | | | | | | P1 | P2 | | | | | | | | | P1 | P2 | | | | | | | | | | |
| Solution Grant | G1 | G2 | | | | | | | G4 | G1 | G2 | | | | | | | | G4 | G1 | G2 | | | | | | | | | | | |
| Solution PHICH | P1 | P2 | | | | | | | P4 | P1 | P2 | | | | | | | | P4 | P1 | P2 | | | | | | | | | | | |

Fig. 9

| UL/DL configuration5 | | | | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|
| subframe index | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| subframe | D | D | D | S | U | D | D | D | D | D | D | D | D | S | U | D | D | D | D | D | D | D | D | S | U | D | D | D | D | D | D | D | D | S | U | D | D | D | D | D |
| HARQ Process ID | 1 | | | 2 | 1 | | | | | | | | | 2 | 1 | | | | | | | | | 2 | 1 | | | | | | | | | 2 | 1 | | | | | |
| UL Grant/PHICH | Rel.8 | G1 | | | | | | | | | G1 | | | | | | | | | | G1 | | | | | | | | | | G1 | | | | | | | | | |
| | PHICH P1 | | | | | | | | | | P1 | | | | | | | | | | P1 | | | | | | | | | | P1 | | | | | | | | | |
| Solution | Grant G1 | | | | | | | | G2 | G1 | | | | | | | | | G2 | G1 | | | | | | | | | G2 | G1 | | | | | | | | | | |
| | PHICH P1 | | | | | | | | P2 | P1 | | | | | | | | | P2 | P1 | | | | | | | | | P2 | P1 | | | | | | | | | | |

Fig. 10

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4,6 | 6 | | | | 4,6 | 6 | | | |
| 1 | 6 | 6 | | | 4 | | 6 | | | 4 |
| 2 | | | | 4 | | | | | 4 | |
| 3 | 4 | | | | | | | 4 | 4 | 4 |
| 4 | | | | | | | | 4 | 4 | 4 |
| 5 | | | | | | | | 4 | 4 | |
| 6 | 7,6 | 7 | | | | 7,6 | 7 | | | 5 |

Fig. 11

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | 6 | 6 | | | 4 | 6 | 6 | | | 4 |
| 2 | | 6 | | | | | 6 | | 4 | |
| 3 | | | | 4 | | | | 4 | 4 | 4 |
| 4 | | | | | | | | 4 | 4 | 4 |
| 5 | | | | | | | | 4 | 4 | |
| 6 | 7 | 7 | | | | 7 | 7 | | | 5 |

Fig. 12

| TDD UL/DL Configuration n | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Fig. 13

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 1 | | 4 | 4 | | | | 4 | 4 | | |
| 2 | | 5 | 6 | | | | 5 | 6 | | |
| 3 | | 6 | 6 | 6 | | | | | | |
| 4 | | 6 | 6 | | | | | | | |
| 5 | | 6 | | | | | | | | |

Fig. 14

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 6 | | | 4 | 6 | 6 | | | 4 | 7 | 7 |

Fig. 15

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | 5 | 4 | 7 | 6 | | 5 | 4 | 7 | 6 |
| 6 | | 4 | 4 | 6 | 6 | | 4 | 4 | 7 | |

Fig. 16

METHOD AND APPARATUS FOR PERFORMING HYBRID AUTOMATIC REPEAT REQUEST PROCESSES

BACKGROUND

Field

Certain embodiments of the present invention relate to implementing a hybrid automatic repeat request (HARQ) process for physical uplink shared channel transmission in special subframes.

Description of the Related Art

Long-term Evolution (LTE) is a standard for wireless communication that seeks to provide improved speed and capacity for wireless communications by using new modulation/signal processing techniques. The standard was proposed by the $3^{rd}$ Generation Partnership Project (3GPP), and is based upon previous network technologies. Since its inception, LTE has seen extensive deployment in a wide variety of contexts involving the communication of data. Long-term Evolution Time-Division Duplex (LTE-TDD) is a 4G telecommunications technology that may alternate between uploading and downloading data through time.

SUMMARY

According to a first embodiment, a method may include receiving, by a user equipment, an uplink grant in a specific subframe of a frame and/or a physical hybrid-ARQ indicator channel transmission, for a physical-uplink-shared-channel transmission or retransmission on a special subframe. The method may also include determining that the uplink grant validates transmitting a physical-uplink-shared-channel transmission on the special subframe, or that the physical hybrid-ARQ indicator channel transmission validates transmitting a physical-uplink-shared-channel retransmission on the special subframe. The method may also include determining transmission parameters for transmitting the physical-uplink-shared-channel transmission or retransmission. The method may also include transmitting the physical-uplink-shared-channel transmission or retransmission on the special subframe.

In the method of the first embodiment, the transmitting the physical-uplink-shared-channel transmission or retransmission on the special subframe comprises transmitting on an uplink pilot time slot.

In the method of the first embodiment, the physical-uplink-shared-channel transmission relates to the HARQ process defined for subframe #1 and/or subframe #6 of the radio frame.

In the method of the first embodiment, the determining the transmission parameters comprises determining transmission parameters corresponding to an uplink index from the uplink grant, if the uplink-downlink configuration of the frame is configuration 0 or 6.

In the method of the first embodiment, the determining the transmission parameters comprises determining a scaling of a transport block size.

In the method of the first embodiment, the method may also include determining whether physical hybrid-ARQ indicator channel transmissions have been transmitted.

In the method of the first embodiment, the method may also include receiving physical hybrid-ARQ indicator channel transmissions for uplink hybrid-ARQ processes transmitted on special subframe for uplink-downlink configuration 1, 2, 3, 4, and 5.

In the method of the first embodiment, for uplink-downlink configuration 1, 2, 3, 4, and 5, the user equipment does not receive physical hybrid-ARQ indicator channel transmissions for uplink hybrid-ARQ processes transmitted on the special subframe, and the re-transmission is scheduled by uplink grant in the specific subframe.

In the method of the first embodiment, for uplink-downlink configuration 0 and 6, the user equipment does not receive physical hybrid-ARQ indicator channel transmissions for uplink hybrid-ARQ processes transmitted on the special subframe, and the re-transmission is scheduled by uplink grant in the specific subframe.

In the method of the first embodiment, for uplink-downlink configuration 0 and 6, the user equipment receives physical hybrid-ARQ indicator channel transmissions for hybrid-ARQ processes transmitted on the special subframe.

In the method of the first embodiment, the time difference between physical-uplink-shared-channel transmission on the special subframe and physical-uplink-shared-channel re-transmission on the special subframe is 10 milliseconds.

According to a second embodiment, an apparatus may include first receiving means for receiving an uplink grant in a specific subframe of a frame and/or a physical hybrid-ARQ indicator channel transmission, for a physical-uplink-shared-channel transmission or retransmission on a special subframe. The apparatus may also include first determining means for determining that the uplink grant validates transmitting a physical-uplink-shared-channel transmission on the special subframe, or that the physical hybrid-ARQ indicator channel transmission validates transmitting a physical-uplink-shared-channel retransmission on the special subframe. The apparatus may also include second determining means for determining transmission parameters for transmitting the physical-uplink-shared-channel transmission or retransmission. The apparatus may also include transmitting means for transmitting the physical-uplink-shared-channel transmission or retransmission on the special subframe.

In the apparatus of the second embodiment, the transmitting the physical-uplink-shared-channel transmission or retransmission on the special subframe comprises transmitting on an uplink pilot time slot.

In the apparatus of the second embodiment, the physical-uplink-shared-channel transmission relates to the HARQ process defined for subframe #1 and/or subframe #6 of the radio frame.

In the apparatus of the second embodiment, the determining the transmission parameters comprises determining transmission parameters corresponding to an uplink index from the uplink grant, if the uplink-downlink configuration of the frame is configuration 0 or 6.

In the apparatus of the second embodiment, the determining the transmission parameters comprises determining a scaling of a transport block size.

In the apparatus of the second embodiment, the apparatus may also include third determining means for determining whether physical hybrid-ARQ indicator channel transmissions have been transmitted.

In the apparatus of the second embodiment, the apparatus may also include second receiving means for receiving physical hybrid-ARQ indicator channel transmissions for uplink hybrid-ARQ processes transmitted on special subframe for uplink-downlink configuration 1, 2, 3, 4, and 5.

In the apparatus of the second embodiment, for uplink-downlink configuration 1, 2, 3, 4, and 5, the user equipment does not receive physical hybrid-ARQ indicator channel transmissions for uplink hybrid-ARQ processes transmitted on the special subframe, and the re-transmission is scheduled by uplink grant in the specific subframe.

In the apparatus of the second embodiment, for uplink-downlink configuration 0 and 6, the user equipment does not receive physical hybrid-ARQ indicator channel transmissions for uplink hybrid-ARQ processes transmitted on the special subframe, and the re-transmission is scheduled by uplink grant in the specific subframe.

In the apparatus of the second embodiment, for uplink-downlink configuration 0 and 6, the user equipment receives physical hybrid-ARQ indicator channel transmissions for hybrid-ARQ processes transmitted on the special subframe.

In the apparatus of the second embodiment, the time difference between physical-uplink-shared-channel transmission on the special subframe and physical-uplink-shared-channel re-transmission on the special subframe is 10 milliseconds.

According to a third embodiment, a computer program product may be embodied on a non-transitory computer readable medium. The computer program product configured to control a processor to perform a method according to the first embodiment.

According to a fourth embodiment, a method may include transmitting, by a network node, an uplink grant in a specific subframe of a frame and/or a physical hybrid-ARQ indicator channel transmission, for a physical-uplink-shared-channel transmission or retransmission on a special subframe. The uplink grant validates transmitting a physical-uplink-shared-channel transmission, by a user equipment, on the special subframe, or the physical hybrid-ARQ indicator channel transmission validates transmitting a physical-uplink-shared-channel retransmission on the special subframe. The method may also include receiving the physical-uplink-shared-channel transmission or retransmission on the special subframe.

In the method of the fourth embodiment, the network node comprises an evolved Node B.

In the method of the fourth embodiment, the receiving the physical-uplink-shared-channel transmission or retransmission on the special subframe comprises receiving on an uplink pilot time slot.

According to a fifth embodiment, an apparatus may include transmitting means for transmitting an uplink grant in a specific subframe of a frame and/or a physical hybrid-ARQ indicator channel transmission, for a physical-uplink-shared-channel transmission or retransmission on a special subframe. The uplink grant validates transmitting a physical-uplink-shared-channel transmission, by a user equipment, on the special subframe, or the physical hybrid-ARQ indicator channel transmission validates transmitting a physical-uplink-shared-channel retransmission on the special subframe. The apparatus may also include receiving means for receiving the physical-uplink-shared-channel transmission or retransmission on the special subframe.

In the apparatus of the fifth embodiment, the apparatus comprises an evolved Node B.

In the apparatus of the fifth embodiment, the receiving the physical-uplink-shared-channel transmission or retransmission on the special subframe comprises receiving on an uplink pilot time slot.

According to a sixth embodiment, a computer program product may be embodied on a non-transitory computer readable medium, the computer program product configured to control a processor to perform a method according to the fourth embodiment.

According to a seventh embodiment, an apparatus may include at least one processor. The apparatus may also include at least one memory including computer program code. The at least one memory and the computer program code may be configured, with the at least one processor, to cause the apparatus at least to receive an uplink grant in a specific subframe of a frame and/or a physical hybrid-ARQ indicator channel transmission, for a physical-uplink-shared-channel transmission or retransmission on a special subframe. The apparatus may also be caused to determine that the uplink grant validates transmitting a physical-uplink-shared-channel transmission on the special subframe, or that the physical hybrid-ARQ indicator channel transmission validates transmitting a physical-uplink-shared-channel retransmission on the special subframe. The apparatus may also be caused to determine transmission parameters for transmitting the physical-uplink-shared-channel transmission or retransmission. The apparatus may also be caused to transmit the physical-uplink-shared-channel transmission or retransmission on the special subframe.

According to an eighth embodiment, an apparatus may include at least one processor. The apparatus may also include at least one memory including computer program code. The at least one memory and the computer program code may be configured, with the at least one processor, to cause the apparatus at least to transmit an uplink grant in a specific subframe of a frame and/or a physical hybrid-ARQ indicator channel transmission, for a physical-uplink-shared-channel transmission or retransmission on a special subframe. The uplink grant validates transmitting a physical-uplink-shared-channel transmission, by a user equipment, on the special subframe, or the physical hybrid-ARQ indicator channel transmission validates transmitting a physical-uplink-shared-channel retransmission on the special subframe. The apparatus may also be caused to receive the physical-uplink-shared-channel transmission or retransmission on the special subframe.

BRIEF DESCRIPTION OF THE DRAWINGS:

For proper understanding of the invention, reference should be made to the accompanying drawings, wherein:

FIG. 1(a) illustrates special subframe configurations.

FIG. 1(b) illustrates seven existing uplink/downlink (UL/DL) configurations for a radio frame.

FIG. 2 illustrates HARQ processes for UL/DL configuration 0 for a first alternative, in accordance with certain embodiments of the present invention.

FIG. 3 illustrates HARQ processes for UL/DL configuration 0 for a second alternative, in accordance with certain embodiments of the present invention.

FIG. 4 illustrates HARQ processes for UL/DL configuration 1, in accordance with certain embodiments of the present invention.

FIG. 5 illustrates HARQ processes for UL/DL configuration 6 for a first alternative, in accordance with certain embodiments of the present invention.

FIG. 7 illustrates HARQ processes for UL/DL configuration 2, in accordance with certain embodiments of the present invention.

FIG. 8 illustrates HARQ processes for UL/DL configuration 3, in accordance with certain embodiments of the present invention.

FIG. 9 illustrates HARQ processes for UL/DL configuration 4, in accordance with certain embodiments of the present invention.

FIG. 10 illustrates HARQ processes for UL/DL configuration 5, in accordance with certain embodiments of the present invention.

FIG. 11 illustrates an UL grant timing with newly-introduced HARQ processes, in accordance with certain embodiments of the present invention.

FIG. 12 illustrates an UL grant timing with newly-introduced HARQ processes, in accordance with certain embodiments of the present invention.

FIG. 13 illustrates determination of a Physical Hybrid ARQ Indicator Channel (PHICH) subframe for the PUSCH transmission, in accordance with certain embodiments of the present invention.

FIG. 14 illustrates PHICH resource reservation with newly introduced HARQ process(es) in UL/DL configuration 1-5.

FIG. 15 illustrates no PHICH resource reservation with newly introduced HARQ process(es) in UL/DL configuration 0 and 6 (Alternative 1).

FIG. 16 illustrates PHICH resource reservation with newly introduced HARQ process(es) in UL/DL configuration 0 and 6 (Alternative 2).

Figure 6:
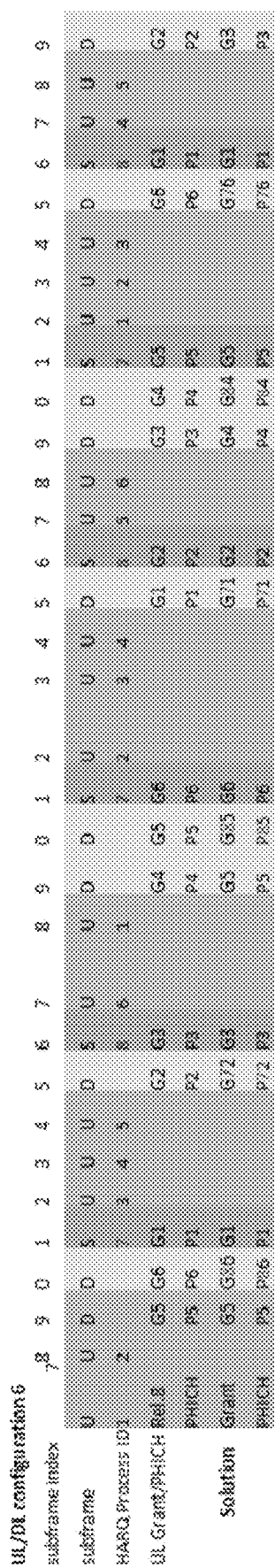
FIG. 6 illustrates HARQ processes for UL/DL configuration 6 for a second alternative, in accordance with certain embodiments of the present invention.

DETAILED DESCRIPTION:

Certain embodiments of the present invention relate to implementing hybrid automatic repeat request (HARQ) processes for physical uplink shared channel transmissions in special subframes. A new Release 14 Work Item entitled "UL capacity enhancements for LTE" was approved in a RAN #71 meeting in March 2016. Objectives of the work item relate to the introduction of performing Physical Uplink Shared Channel (PUSCH) transmission in a special subframe, as described below:

UL support of PUSCH transmission in special subframe [RAN1]
  Specify mechanism for supporting PUSCH transmission in special subframe with DwPTS of 6 OFDM symbols, GP of 2 OFDM symbols. [RAN1, RAN2]
  Introduce applicable RF requirements [RAN4]
  Backward compatibility with legacy UEs is maintained With LTE Rel-13, an Uplink Pilot Time Slot (UpPTS) can be configured with up to six Single Carrier Frequency Division Multiplexing Access (SC-FDMA) symbols, which can be used for transmitting a Sounding Reference Signal (SRS) or for performing short Physical Random Access Channel (PRACH) transmissions. However, the previous releases do not allow multiplexing of PUSCH data for transmission on the UpPTS region. With LTE Rel-8-LTE Rel-12, an UpPTS can be configured with up-to two SC-FMDA symbols.

With a special subframe configuration 6:2:6 (DwPTS:GP: UpPTS), corresponding to six symbols for the Downlink Pilot Time Slot: two symbols for the Guard Period: six symbols for the Uplink Pilot Time Slot, PUSCH could be transmitted on the UpPTS. For such an operation, a new HARQ design may need to be considered. With the new HARQ design, there may be a shortened PUSCH transmission of less than 6 Single Carrier Frequency Division Multiplexing Access (SC-FDMA) symbols, for the existing seven UL/DL configurations. These 6 symbols are to be shared between PUSCH, related demodulation reference signals/uplink pilot timeslot as well as sounding reference signals (SRS).

Currently, Physical Uplink Shared Channel (PUSCH) can occupy 12 symbols in a normal UL subframe with 2 symbols for DM-RS. However, with the new special subframe configuration, considering that at least one symbol should be used for DM-RS, only at most 5 symbols may be available for PUSCH transmission in subframe 1 and/or subframe 6.

LTE uplink is currently using non-adaptive Synchronous HARQ, which uses a Physical Hybrid ARQ Indicator Channel (PHICH) to provide the ACK/NACK feedback. Retransmission can be triggered also by UL grant. This corresponds to synchronous adaptive re-transmission. For HARQ operation of the special subframe for PUSCH transmission, the following issues need to be considered.

One issue is that there may be a varying number of resource elements (REs) for combined (re)-transmission of PUSCH transport blocks in UpPTS and normal UL subframes. For DwPTS, there is currently a scaling factor of the transport block size (TBS) that is defined for DL operation (e.g., a scaling of 0.35 for special subframe configuration 9, or a scaling of 0.75 for the others). FIG. 1(a) illustrates special subframe configurations. The special subframe configurations of FIG. 1(a) are defined in spec 36.211. Generally speaking, a special subframe configuration defines the number of symbols available for DwPTS, GP and UpPTS in the special subframe. For UpPTS PUSCH, a similar scaling could be envisioned (e.g., a scaling of 0.5). With scaling, the resulting modulation and coding rate in a special subframe is about the same as in a normal UL subframe although the number of symbols available is reduced. If there is no scaling, the coding rate may be automatically approximately doubled, compared to the full 14-symbol PUSCH subframes.

Assuming a PHICH type of non-adaptive Synchronous HARQ operation, for a retransmission of a full subframe in UpPTS, the effective coding rate may be double (because only about half of the resources are available). This type of operation is not very efficient. Assuming a PHICH type of non-adaptive Synchronous HARQ operation, for a retransmission of a UpPTS initial transmission, twice the amount of resources may be available (double the effective coding rate and maybe some 0-padding may be needed). This operation is also not very efficient because an excessive amount of resources is used.

With the special subframe configuration 6:2:6, one or two new UL HARQ process(es) could be introduced in order to enable scheduling of a single UE for all PUSCH opportunities, according to the different UL/DL configurations shown in FIG. 1(b). FIG. 1(b) illustrates seven existing uplink/downlink (UL/DL) configurations of the LTE Time-Division-Duplex frame structure type 2. New UL HARQ processes may relate to special subframe(s) shown in FIG. 1(b). Certain embodiments of the present invention are directed to methods of performing uplink (UL) HARQ transmission in view of the newly-introduced HARQ process(es). Certain embodiments of the present invention are directed to a UL HARQ design with different UL/DL configurations. Certain embodiments include the following design aspects.

For UL HARQ process(es) corresponding to special subframe(s), the Round Trip Time (RTT) for Uplink Pilot Time Slot (UpPTS) PUSCH transmissions is fixed to 10 ms for all UL/DL configurations. Hence, re-transmissions of a HARQ process that are initially transmitted on UpPTS PUSCH will fall into a UpPTS that corresponds to the next/subsequent radio frame(s), and retransmission of the UpPTS PUSCH will not occur on a regular UL subframe. Therefore, the above-described efficiency problems will not occur. The UL grant for UpPTS PUSCH will be sent in a DL subframe with a fixed subframe number for new HARQ process(es).

HARQ process timing and feedback mechanisms for the transmission of PUSCH in normal/full UL subframes can be applied in a similar manner as compared to the legacy releases. A UE that supports PUSCH transmission via UpPTS may support one or two additional HARQ processes, depending on the configured UL/DL configuration, as compared to the legacy operation. The number of additional HARQ processes depends on the number of special subframes per radio frame.

With regard to HARQ ACK/NACK feedback procedures for UpPTS PUSCH, for UL/DL configurations 1-5, PHICH resources are reserved for UpPTS PUSCH HARQ operations. UE will determine the HARQ ACK/NACK by decoding the PHICH within the reserved PHICH resource. Reserving the PHICH resource means that the UE will check the HARQ ACK by decoding PHICH channel. The PHICH resource is determined by cyclic shift for demodulation reference symbol (DMRS) of PUSCH and a lowest physical resource block (PRB) index of PUSCH transmission.

For UL/DL configuration 0 and 6, two alternatives are given. With a first alternative, complicated PHICH resource reservation and mapping will not need to be introduced. Instead, a PHICH-less option is applied (at least for the new HARQ processes defined for the special subframe). The PUSCH re-transmission is dependent on UL scheduling (i.e., where retransmissions are scheduled by an UL grant). With a second alternative, additional PHICH resources are reserved for UpPTS PUSCH HARQ operation.

For UL/DL configuration #6, an additional UL index is included in the UL grant, in order to support PUSCH scheduling for UpPTS, based on multi-subframe scheduling principles. The multi-subframe scheduling is mentioned in the UL grant part. More specifically, a two-bit UL index is introduced in subframe 0 and 6 for UL/DL configuration 6. If the Most Significant Bit (MSB) of UL index in the DCI format 0/4 is set to 1, UE shall transmit PUSCH in subframe n+7 as shown in FIG. 1(b). If the Least Significant Bit (LSB) of UL index in the DCI format 0/4 is set to 1, UE shall transmit PUSCH in subframe n+6, e.g., in special subframe, where the corresponding UL grant is transmitted in subframe n. Alternatively, the MSB may indicate PUSCH transmission in special subframe, and LSB may indicate PUSCH transmission in subframe n+7. In another embodiment, UpPTS PUSCH transmission for UL/DL configuration 6 may not be supported.

Certain embodiments of the present invention (from the perspective of the UE) can be directed to a method, which can be summarized as follows. The method may include receiving an UL grant in subframe n. The method may include determining that the UL grant is valid for transmitting PUSCH on a special subframe (UpPTS). For UL/DL configuration 0 and 6, the method may include determining the UL index (from the UL grant) for PUSCH in UpPTS. The method may include determining transmission parameters for PUSCH. This determining may involve determining the scaling of a transport block size (TBS). The method may also include transmitting PUSCH in UpPTS.

The method may also include determining whether PHICH corresponding to the PUSCH is transmitted. The determination of whether PHICH is transmitted may be based on the UL/DL configuration. For UL/DL configurations 0 and 6, with one embodiment, a PHICH-less option is applied. The PUSCH re-transmission is dependent on UL scheduling (i.e., where retransmission is scheduled by an UL grant). For UL/DL configurations 0 and 6, with another embodiment, PHICH resources are reserved for UpPTS PUSCH HARQ operation. For UL/DL configurations 1-5, PHICH resources are reserved for UpPTS PUSCH HARQ operation. The method may also include receiving PHICH or trying to detect an UL grant for a retransmission. Preferably, the retransmission occurs in subframe n+10 (i.e., 10 subframes=10 ms later compared to the previous transmission).

With certain embodiments, the newly-introduced UL HARQ process(es) that are transmitted in a special subframe have a 10 ms RTT, thus ensuring that the PUSCH retransmission will occur in a same type of subframe as the initial transmission. Therefore, the retransmission is guaranteed to occur with high efficiency.

With the existing seven UL/DL configurations, the details of the HARQ and feedback procedure are illustrated below.

As described above, FIG. 2 illustrates HARQ processes for UL/DL configuration 0 for alternative 1, in accordance with certain embodiments of the present invention. The new HARQ processes are scheduled by multi-subframe scheduling via a UL index. New UL HARQ processes (such as processes #8 and #9) are scheduled in subframes 5 and 0, respectively (see FIG. 2), together with existing HARQ processes. RTT is selected to be 10 ms for the two new HARQs processes located in UpPTS. No PHICH resources for the two HARQ process are reserved. Identifying the HARQ process ID is not needed in the UL grant because the new additional HARQ processes may be specific to the utilization of UpPTS. They are triggered based on the existing triggering scheme that is defined for multi-subframe scheduling with UL/DL configuration 0.

For alternative 1, if the UE does not receive the UL grant in subframe 5 of the next radio frame for HARQ process #8, an ACK will be delivered to the higher layer by the UE. In comparison with legacy HARQ process scheduling, the new HARQ process replaces the existing HARQ process in UL index in UL grant, the replaced HARQ process can still be scheduled with a new transmission or re-transmission via UL grant in DCI format 0 or 4, or the replaced HARQ process can be scheduled in a next subframe. In other words, this alternative has little impact on existing HARQ process operation.

Another alternative is illustrated in FIG. 3. FIG. 3 illustrates HARQ processes for UL/DL configuration 0, for a second alternative, in accordance with certain embodiments of the present invention. HARQ process #8 is scheduled in subframe 6, and HARQ process #9 is scheduled in subframe 1, respectively. New PHICH resources are reserved for HARQ process #8 and #9. Existing HARQ process timing and feedback mechanisms can be maintained for normal/full UL subframes similarly as in the legacy releases. However, this results in the scenario where the UL subframe is not continuously scheduled in subframe 0, 1, 5 and 6, and the PUSCH in a latter subframe is scheduled first compared to UpPTS PUSCH.

For UL/DL configurations 1-5, the UL grant is introduced and transmitted for new HARQ processes on the DL subframe which, in previous releases, did not carry any UL grant. For PHICH transmission of the UpPTS HARQ processes, there are two options. With one option, PHICH is transmitted in the subframe which also carries the UL grant. With another option, no PHICH resource is reserved, and adaptive synchronous HARQ is applied with a 10 ms RTT.

Figure 4:
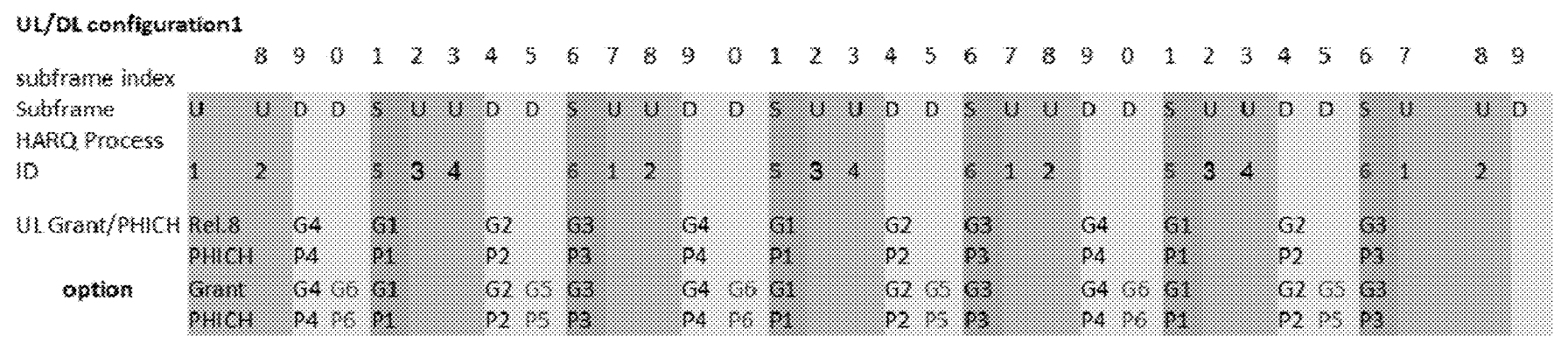

FIG. 4 illustrates HARQ processes for UL/DL configuration 1, in accordance with certain embodiments of the present invention. FIG. 4 illustrates an example with a PHICH resource reserved for the new UL HARQ processes. To be more specific, the new UL HARQ process 5 is always scheduled in subframe 5, as shown in FIG. 4. The UE will detect PHICH for HARQ ACK/NACK feedback also in subframe 5. UL HARQ process 6 is scheduled in subframe 0 via the UL grant or trigger by PHICH. With certain embodiments of the present invention, new HARQ processes can be handled together with the HARQ processes defined in LTE Release 8, which allows for a simpler implementation for both UE/evolved Node B (eNB). The HARQ process handling for UL/DL configurations 2-5 are shown in FIGS. 7-10. FIG. 7 illustrates HARQ processes for UL/DL configuration 2, in accordance with certain embodiments of the present invention. FIG. 8 illustrates HARQ processes for UL/DL configuration 3, in accordance with certain embodiments of the present invention. FIG. 9 illustrates HARQ processes for UL/DL configuration 4, in accordance with certain embodiments of the present invention. FIG. 10 illustrates HARQ processes for UL/DL configuration 5, in accordance with certain embodiments of the present invention.

With UL/DL configuration 6, a UL grant for new UL HARQ processes #7 and #8, transmitted in UpPTS, may be based on multi-subframe scheduling. With UL/DL configuration 6, and with alternative 1, HARQ process #7 is scheduled in subframe 5 (together with existing HARQ processes). HARQ process #8 is scheduled in subframe 0 (together with existing HARQ processes). No PHICH resources are reserved for two new HARQ processes, and RTT is 10 ms. Based on the scheduling subframe, these two new HARQ processes for UpPTS can be differentiated.

Another alternative is to reserve the PHICH resources for a new HARQ process, and the scheduling timing of new HARQ process may be the same as alternative 1. Two bits of UL index are needed to schedule PUSCH in a normal UL subframe and a PUSCH in special subframe, as multi-subframe scheduling of one normal subframe and UpPTS is applied. Existing HARQ process (for normal subframes) timing and feedback mechanisms are similar to those of the legacy releases.

Figure 5:
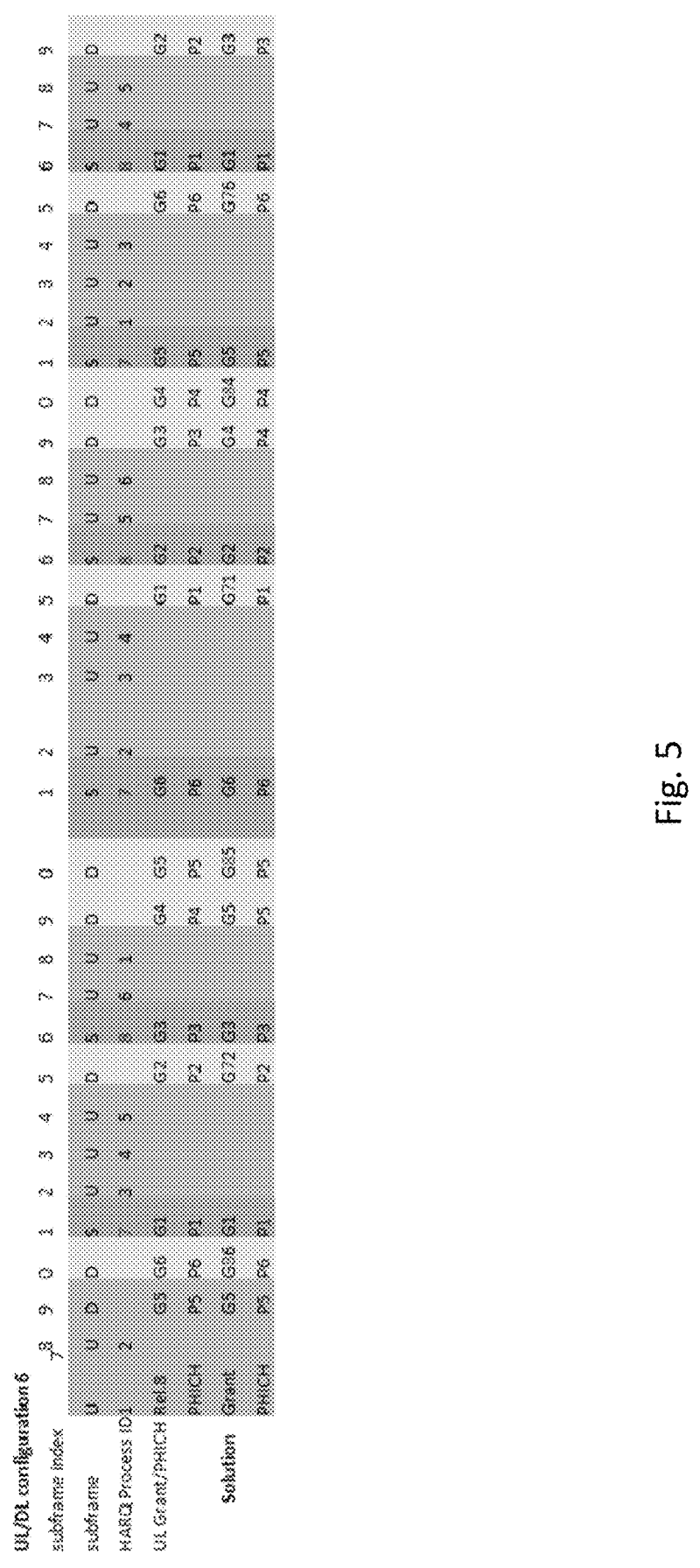

Alternative 1 is illustrated in FIG. 5. FIG. 5 illustrates HARQ processes for UL/DL configuration 6 for a first alternative, in accordance with certain embodiments of the present invention. HARQ process #7 and #8 are the newly introduced HARQ processes and are transmitting in the special subframe. Other HARQ processes and related scheduling/PHICH timing are defined according to Release 8 rules. HARQ process #8 is scheduled in subframe 0. If the UE does not receive the UL grant in subframe 0 of a next radio frame, an ACK will be delivered to the higher layer by the UE. To support scheduling for the new HARQ processes, the UL index needs to be introduced in the case of UL/DL configuration 6 to enable the scheduling of one normal UL subframe and/or a UpPTS subframe using a single UL grant.

FIG. 6 illustrates HARQ processes for UL/DL configuration 6 for a second alternative, in accordance with certain embodiments of the present invention. Alternative 2 is illustrated in FIG. 6, where the UL grant and PHICH are sent in subframe 5 for HARQ process #7.

With certain embodiments of the present invention, the potential standard impacts on TS36.213 are illustrated below. With regard to the UL Grant, the UE may, upon (1) detection of an (Enhanced) Physical Downlink Control Channel ((E)PDCCH) with uplink Downlink Control Information (DCI) format and/or (2) detection of a PHICH transmission in subframe n intended for the UE, adjust the corresponding PUSCH transmission in subframe n+k, with k given in Table 8-2 in 36.213 (as shown in FIG. 11). FIG. 11 illustrates an UL grant timing with newly-introduced HARQ processes.

For UL/DL configuration 0, (E)PDCCH in subframe 0 and 5 can schedule PUSCH in subframe n+k (where k=4) and n+6 (special subframe). (E)PDCCH in subframe 1 and 6 can schedule PUSCH in subframe n+k (where k=6) or n+7.

For UL/DL configuration 1, (E)PDCCH in subframe 0 and 5 can schedule PUSCH in special subframe n+k (where k=6). For UL/DL configuration 2, (E)PDCCH in subframe 1 and 6 can schedule PUSCH in special subframe n+k (where k=5). With another option, (E)PDCCH in subframe 0 and 5 can schedule PUSCH in special subframe n+k (where k=6). For configurations 3-5, the UL grant will be sent in subframe 7 to schedule PUSCH in subframe 1. For configuration 6, (E)PDCCH in subframes 0 and 5 can schedule PUSCH in subframe n+k (where k=7) and n+6 (special subframe). Two bit UL index is introduced in subframe 0 and 6 for UL/DL configuration 6. If the MSB of UL index in the DCI format 0/4 is set to 1, UE shall transmit PUSCH in subframe n+7; if the LSB bit of UL index in the DCI format 0/4 is set to 1, UE shall transmit PUSCH in subframe n+6, e.g., in special subframe, where the UL grant is transmitted in subframe n. MSB indicates PUSCH transmission in special subframe, LSB indicates PUSCH transmission in n+7.

FIG. 12 illustrates an UL grant timing with newly-introduced HARQ processes with the PHICH resource reservation. Comparing with UL grant for newly-introduced HARQ processes without PHICH resource reservation, the difference is the PHICH resources are reserved for new HARQ processes. In addition, for UL/DL configuration 0, the new HARQ processes are scheduled in different DL subframes, e.g., in subframe 1 and 6 for each new HARQ process.

FIG. 13 illustrates the determination of PHICH subframe for the PUSCH transmission. With regard to PHICH, if PUSCH is scheduled in subframe n, the corresponding PHICH resource is determined in subframe n+K_PHICH, which is defined in table 9.1.2-1 in 36.213, (as shown in FIG. 13). New HARQs in configurations 1-5 will have the PHICH as shown in FIG. 14. FIG. 14 illustrates PHICH resource reservation with new introduced HARQ process(es) in UL/DL configuration 1-5. For the alternative 1 operation in Fig. 15, no additional PHICH resources for UL/DL configurations 0 and 6 are reserved as PHICH-less operation is done for these. FIG. 16 illustrates a PHICH resource reservation with newly-introduced HARQ process(es) in UL/DL configurations 0 and 6 for Alternative 2.

In view of the above, certain embodiments of the present invention may support PUSCH transmission via UpPTS. Certain embodiments may increase UL peak spectral efficiency as well as UL peak data rate. With certain embodiments, an effective coding rate is not impacted when PUSCH transmits on a normal subframe or special subframe, as retransmission of full subframes are not occurring in UpPTS and vice versa. Thus, PUSCH transmission in special subframes is more efficient. With certain embodiments, existing HARQ processes are not impacted by newly-introduced HARQ processes. With certain embodiments, the eNB UL scheduling and UE implementation can be simplified.

Figure 17:
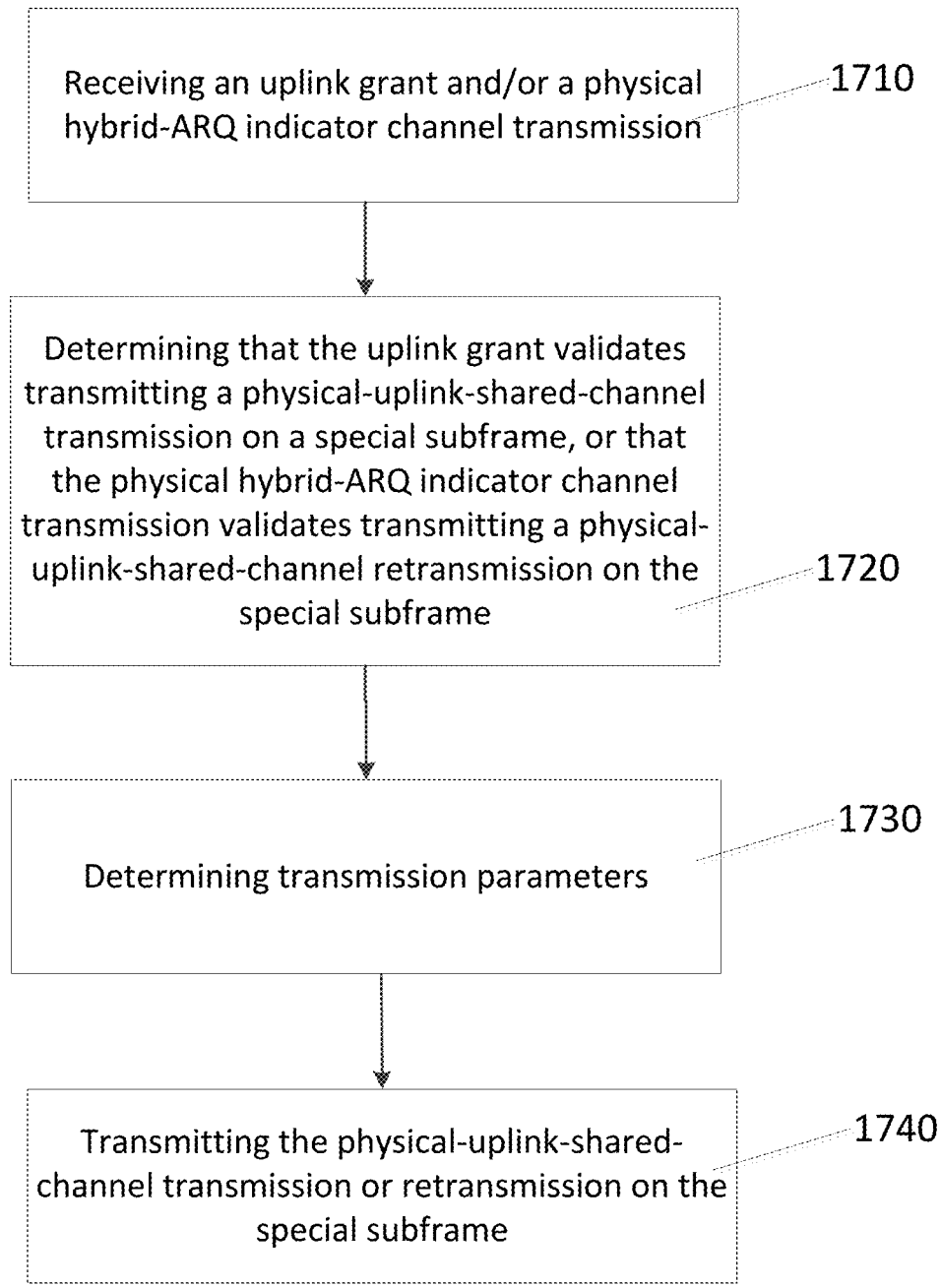
FIG. 17 illustrates a flowchart of a method in accordance with certain embodiments of the invention.

FIG. 17 illustrates a flowchart of a method in accordance with certain embodiments of the invention. The method illustrated in FIG. 17 includes, at 1710, receiving, by a user equipment, an uplink grant in a specific subframe of a frame and/or a physical hybrid-ARQ indicator channel transmission, for a physical-uplink-shared-channel transmission or retransmission on a special subframe. The method also includes, at 1720, determining that the uplink grant validates transmitting a physical-uplink-shared-channel transmission on the special subframe, or that the physical hybrid-ARQ indicator channel transmission validates transmitting a physical-uplink-shared-channel retransmission on the special subframe. The method may also includes, at 1730, determining transmission parameters for transmitting the physical-uplink-shared-channel transmission or retransmission. The method also includes, at 1740, transmitting the physical-uplink-shared-channel transmission or retransmission on the special subframe.

Figure 18:
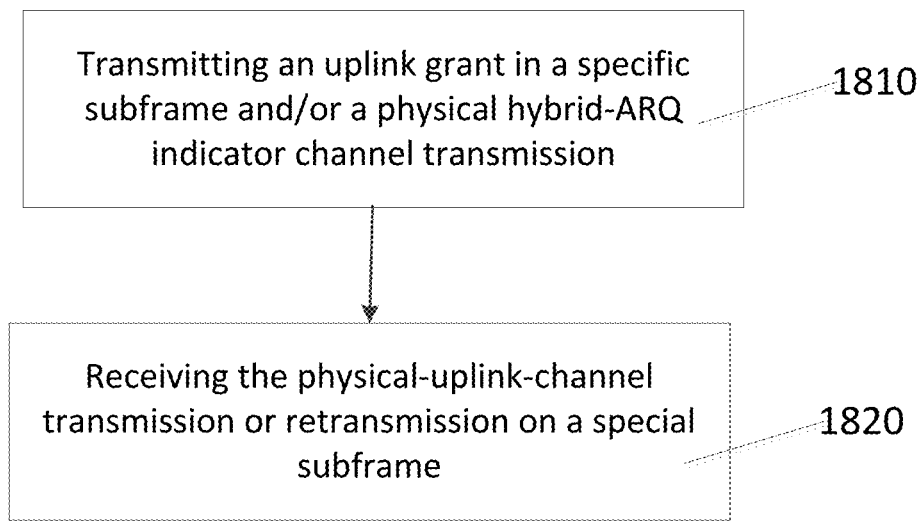
FIG. 18 illustrates a flowchart of a method in accordance with certain embodiments of the invention.

FIG. 18 illustrates a flowchart of a method in accordance with certain embodiments of the invention. The method illustrated in FIG. 18 includes, at 1810, transmitting, by a network node, an uplink grant in a specific subframe of a frame and/or a physical hybrid-ARQ indicator channel transmission, for a physical-uplink-shared-channel transmission or retransmission on a special subframe. The uplink grant validates transmitting a physical-uplink-shared-channel transmission, by a user equipment, on the special subframe, or the physical hybrid-ARQ indicator channel transmission validates transmitting a physical-uplink-shared-channel retransmission on the special subframe. The method also includes, at 1820, receiving the physical-uplink-shared-channel transmission or retransmission on the special subframe.

Figure 19:
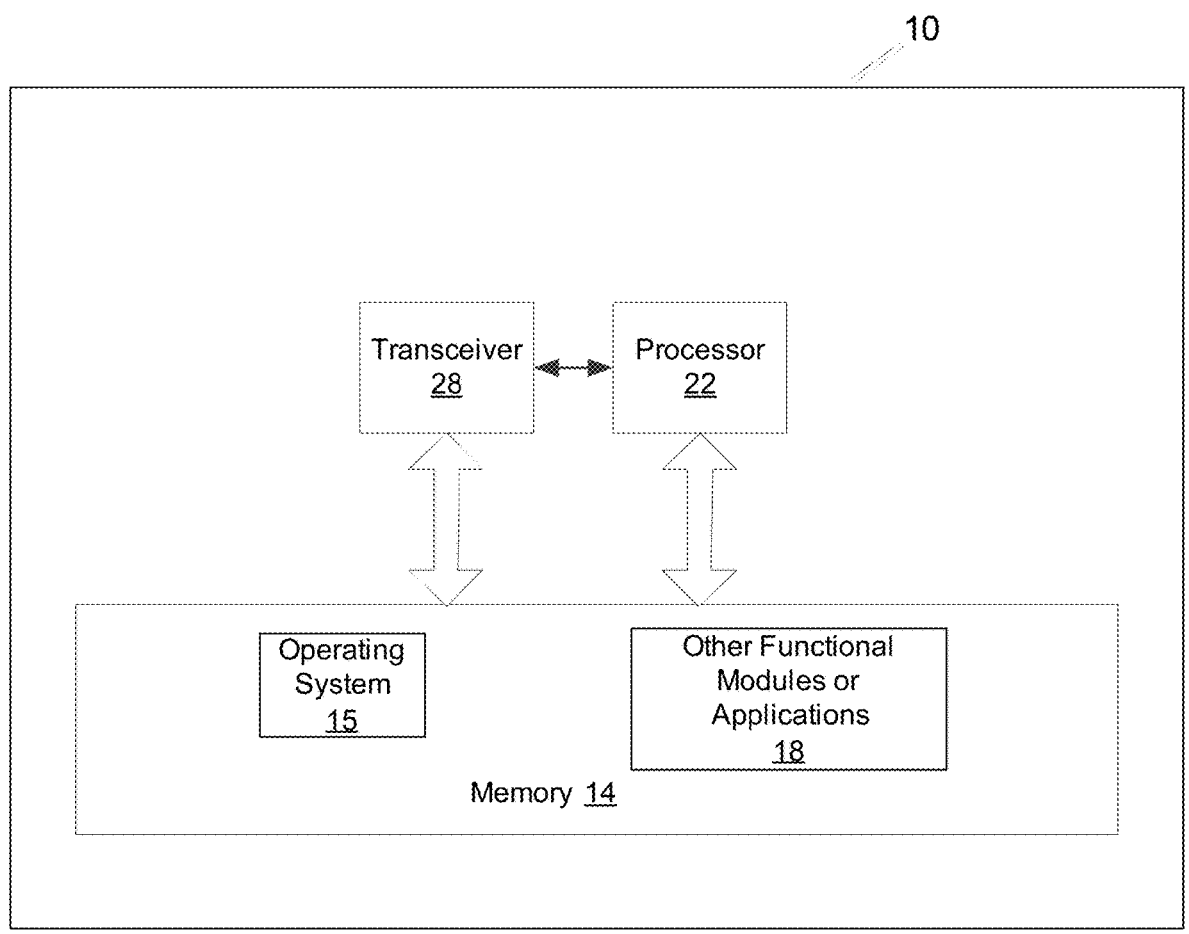
FIG. 19 illustrates an apparatus in accordance with certain embodiments of the invention.

FIG. 19 illustrates an apparatus in accordance with certain embodiments of the invention. In one embodiment, the apparatus can be a network node such as an evolved Node B and/or base station, for example. In another embodiment, the apparatus may correspond to a user equipment, for example. Apparatus 10 can include a processor 22 for processing information and executing instructions or operations. Processor 22 can be any type of general or specific purpose processor. While a single processor 22 is shown in FIG. 19, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

In one embodiment, apparatus 10 may be configured to receive an uplink grant in a specific subframe of a frame and/or a physical hybrid-ARQ indicator channel transmission, for a physical-uplink-shared-channel transmission or retransmission on a special subframe. Apparatus 10 may also be caused to determine that the uplink grant validates transmitting a physical-uplink-shared-channel transmission on the special subframe, or that the physical hybrid-ARQ indicator channel transmission validates transmitting a physical-uplink-shared-channel retransmission on the special subframe. Apparatus 10 may also be caused to determine transmission parameters for transmitting the physical-uplink-shared-channel transmission or retransmission. Apparatus 10 may also be caused to transmit the physical-uplink-shared-channel transmission or retransmission on the special subframe.

In another embodiment, apparatus 10 may be configured to transmit an uplink grant in a specific subframe of a frame and/or a physical hybrid-ARQ indicator channel transmission, for a physical-uplink-shared-channel transmission or retransmission on a special subframe. The uplink grant validates transmitting a physical-uplink-shared-channel transmission, by a user equipment, on the special subframe, or the physical hybrid-ARQ indicator channel transmission validates transmitting a physical-uplink-shared-channel retransmission on the special subframe. Apparatus 10 may also be caused to receive the physical-uplink-shared-channel transmission or retransmission on the special subframe.

Figure 20:
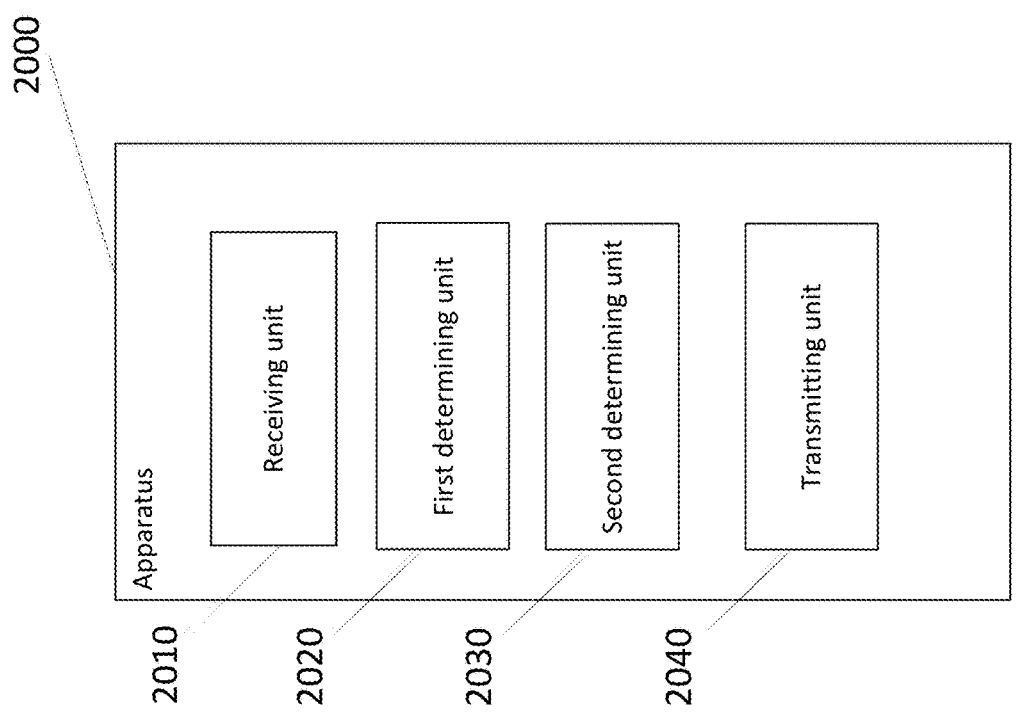
FIG. 20 illustrates an apparatus in accordance with certain embodiments of the invention.

FIG. 20 illustrates an apparatus in accordance with certain embodiments of the invention. Apparatus 2000 can be a user equipment, for example. Apparatus 2000 can include a receiving unit 2010 that receives an uplink grant in a specific subframe of a frame and/or a physical hybrid-ARQ indicator channel transmission, for a physical-uplink-shared-channel transmission or retransmission on a special subframe. Apparatus 2000 can also include a first determining unit 2020 that determines that the uplink grant validates transmitting a physical-uplink-shared-channel transmission on the special subframe, or that the physical hybrid-ARQ indicator channel transmission validates transmitting a physical-uplink-shared-channel retransmission on the special subframe. Apparatus 2000 can also include a second determining unit 2030 that determines transmission parameters for transmitting the physical-uplink-shared-channel transmission or retransmission. Apparatus 2000 also includes a transmitting unit 2040 that transmits the physical-uplink-shared-channel transmission or retransmission on the special subframe.

Figure 21:
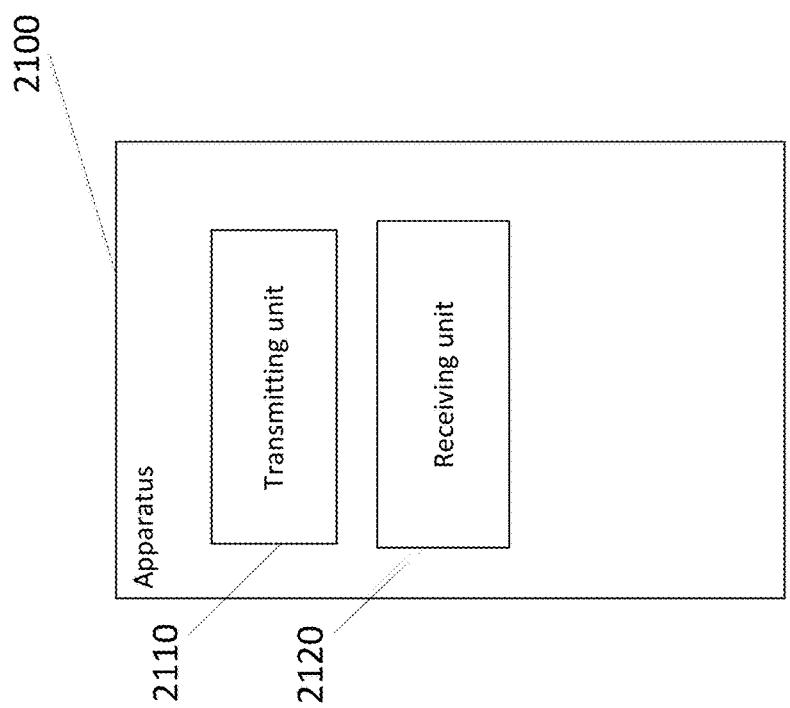
FIG. 21 illustrates an apparatus in accordance with certain embodiments of the invention.

FIG. 21 illustrates an apparatus in accordance with certain embodiments of the invention. Apparatus 2100 can be an evolved Node B, for example. Apparatus 2100 can include a transmitting unit 2110 that transmits an uplink grant in a specific subframe of a frame and/or a physical hybrid-ARQ indicator channel transmission, for a physical-uplink-shared-channel transmission or retransmission on a special subframe. The uplink grant validates transmitting a physical-uplink-shared-channel transmission, by a user equipment, on the special subframe, or the physical hybrid-ARQ indicator channel transmission validates transmitting a physical-uplink-shared-channel retransmission on the special subframe. Apparatus 2100 can also include a receiving unit 2120 that receives the physical-uplink-shared-channel transmission or retransmission on the special subframe.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

What is claimed is:

1. An apparatus, comprising:
   at least one processor; and
   at least one memory including computer program code;
   the at least one memory and the computer program code configured to, with the at least one processor, cause the apparatus at least to:
   receive at least one of an uplink grant in a specific subframe of a frame and a physical hybrid-ARQ indicator channel transmission, for a physical-uplink-shared-channel transmission or retransmission on a subframe;
   determine that the uplink grant validates transmitting a physical-uplink-shared-channel transmission on the subframe, or that the physical hybrid-ARQ indicator channel transmission validates transmitting a physical-uplink-shared-channel retransmission on the subframe;
   determine transmission parameters corresponding to an uplink index from the uplink grant if the uplink-downlink configuration of the frame is configuration 0, 1, 2, 3, 4, 5, or 6 for transmitting the physical-uplink-shared-channel transmission or retransmission; and
   transmit the physical-uplink-shared-channel transmission or retransmission on the subframe,
   wherein the time difference between physical-uplink-shared-channel transmission on the subframe and physical-uplink-shared-channel re-transmission on the subframe is 10 milliseconds, and
   wherein at least one physical hybrid-ARQ indicator channel resource associated with the physical hybrid-ARQ indicator channel transmission is based on cyclic shift for at least one demodulation reference symbol of the physical-uplink-shared-channel transmission or retransmission.

2. The apparatus according to claim 1, wherein the transmitting the physical-uplink-shared-channel transmission or retransmission on the subframe comprises transmitting on an uplink pilot time slot.

3. The apparatus according to claim 1, wherein the physical-uplink-shared-channel transmission relates to the HARQ process defined for at least one of a first subframe and a sixth subframe of the radio frame.

4. The apparatus according to claim 1, wherein the determining the transmission parameters comprises determining transmission parameters corresponding to an uplink index from the uplink grant, if the uplink-downlink configuration of the frame is configuration 0 or 6.

5. The apparatus according to claim 1, wherein the determining the transmission parameters comprises determining a scaling of a transport block size.

6. The apparatus according to claim 1, wherein the at least one memory and the computer program code are configured to, with the at least one processor, cause the apparatus to determine whether physical hybrid-ARQ indicator channel transmissions have been transmitted.

7. The apparatus according to claim 1, wherein the at least one memory and the computer program code are configured to, with the at least one processor, cause the apparatus to receive physical hybrid-ARQ indicator channel transmissions for uplink hybrid-ARQ processes transmitted on subframe for uplink-downlink configuration 1, 2, 3, 4, and 5.

8. The apparatus according to claim 1, wherein for uplink-downlink configuration 1, 2, 3, 4, and 5, a user equipment does not receive physical hybrid-ARQ indicator channel transmissions for uplink hybrid-ARQ processes transmitted on the subframe, and the re-transmission is scheduled by uplink grant in the specific subframe.

9. The apparatus according to claim 1, wherein for uplink-downlink configuration 0 and 6, a user equipment does not receive physical hybrid-ARQ indicator channel transmissions for uplink hybrid-ARQ processes transmitted on the subframe, and the re-transmission is scheduled by uplink grant in the specific subframe.

10. The apparatus according to claim 1, wherein for uplink-downlink configuration 0 and 6, a user equipment receives physical hybrid-ARQ indicator channel transmissions for hybrid-ARQ processes transmitted on the subframe.

11. A computer program product, embodied on a non-transitory computer readable medium, the computer program product configured to control a processor to perform a process, comprising:
   receiving, by a user equipment, at least one of an uplink grant in a specific subframe of a frame and a physical hybrid-ARQ indicator channel transmission, for a physical-uplink-shared-channel transmission or retransmission on a subframe;
   determining that the uplink grant validates transmitting a physical-uplink-shared-channel transmission on the subframe, or that the physical hybrid-ARQ indicator channel transmission validates transmitting a physical-uplink-shared-channel retransmission on the subframe;
   determining transmission parameters corresponding to an uplink index from the uplink grant if the uplink-downlink configuration of the frame is configuration 0, 1, 2, 3, 4, 5, or 6 for transmitting the physical-uplink-shared-channel transmission or retransmission; and transmitting the physical-uplink-shared-channel transmission or retransmission on the subframe, wherein the time difference between physical-uplink-shared-channel transmission on the subframe and physical-uplink-shared-channel re-transmission on the subframe is 10 milliseconds, and wherein at least one physical hybrid-ARQ indicator channel resource associated with the physical hybrid-ARQ indicator channel transmission is based on cyclic shift for at least one demodulation reference symbol of the physical-uplink-shared-channel transmission or retransmission.

12. The computer program product according to claim 11, wherein the transmitting the physical-uplink-shared-channel transmission or retransmission on the subframe comprises transmitting on an uplink pilot time slot.

13. An apparatus, comprising:

at least one processor; and at least one memory including computer program code;

the at least one memory and the computer program code configured to, with the at least one processor, cause the apparatus at least to:

transmit at least of an uplink grant in a specific subframe of a frame and a physical hybrid-ARQ indicator channel transmission, for a physical-uplink-shared-channel transmission or retransmission on a subframe, wherein the uplink grant validates transmitting a physical-uplink-shared-channel transmission, by a user equipment, on the subframe, or the physical hybrid-ARQ indicator channel transmission validates transmitting a physical-uplink-shared-channel retransmission on the subframe; and receive the physical-uplink-shared-channel transmission or retransmission on the subframe associated with transmission parameters corresponding to an uplink index from the uplink grant if the uplink-downlink configuration of the frame is configuration 0, 1, 2, 3, 4, 5, or 6, wherein the time difference between physical-uplink-shared-channel transmission on the subframe and physical-uplink-shared-channel re-transmission on the subframe is 10 milliseconds, and wherein at least one physical hybrid-ARQ indicator channel resource associated with the physical hybrid-ARQ indicator channel transmission is based on cyclic shift for at least one demodulation reference symbol of the physical-uplink-shared-channel transmission or retransmission.

14. The apparatus according to claim 13, wherein the apparatus comprises an evolved Node B.

15. The apparatus according to claim 13, wherein the receiving the physical-uplink-shared-channel transmission or retransmission on the subframe comprises receiving on an uplink pilot time slot.

16. The apparatus according to claim 13, wherein the physical-uplink-shared-channel transmission relates to the HARQ process defined for at least one of a first subframe and a sixth subframe of the radio frame.

17. The apparatus according to claim 13, wherein the at least one memory and the computer program code are configured to, with the at least one processor, cause the apparatus to send physical hybrid-ARQ indicator channel transmissions for uplink hybrid-ARQ processes transmitted on subframe for uplink-downlink configuration 1, 2, 3, 4, and 5.

18. The apparatus according to claim 13, wherein the at least one memory and the computer program code are configured to, with the at least one processor, cause the apparatus, for uplink-downlink configuration 0 and 6, to send physical hybrid-ARQ indicator channel transmissions for hybrid-ARQ processes transmitted on the subframe.

* * * * *